US010534624B2

(12) United States Patent
Antill et al.

(10) Patent No.: US 10,534,624 B2
(45) Date of Patent: Jan. 14, 2020

(54) GENERATING AND STORING TRANSLATION INFORMATION AS PACKAGE METADATA

(75) Inventors: James Antill, Bristol, CT (US); Seth Kelby Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1314 days.

(21) Appl. No.: 12/714,171

(22) Filed: Feb. 26, 2010

(65) Prior Publication Data

US 2011/0214118 A1    Sep. 1, 2011

(51) Int. Cl.
*G06F 9/451* (2018.01)

(52) U.S. Cl.
CPC .................... *G06F 9/454* (2018.02)

(58) Field of Classification Search
CPC ..... G06F 8/60; G06F 8/61; G06F 8/64; G06F 8/51; G06F 9/454
See application file for complete search history.

(56) References Cited

U.S. PATENT DOCUMENTS

| | | | | |
|---|---|---|---|---|
| 5,416,903 A * | 5/1995 | Malcolm | ................ | G06F 9/454 715/703 |
| 5,510,981 A * | 4/1996 | Berger et al. | ...................... | 704/2 |
| 5,678,039 A * | 10/1997 | Hinks | ...................... | G06F 9/454 |
| 5,845,077 A | 12/1998 | Fawcett | | |
| 5,903,859 A * | 5/1999 | Stone et al. | ...................... | 704/8 |
| 6,092,036 A * | 7/2000 | Hamann | ........................ | 704/8 |
| 6,195,678 B1 * | 2/2001 | Komuro | ........................ | 709/202 |
| 6,205,418 B1 * | 3/2001 | Li et al. | ........................ | 704/8 |
| 6,351,726 B1 * | 2/2002 | Wong | ............................ | 704/3 |
| 6,438,749 B1 | 8/2002 | Chamberlain | | |
| 6,553,507 B1 | 4/2003 | Cohen | | |
| 6,778,983 B1 * | 8/2004 | Bates et al. | | |
| 6,789,215 B1 | 9/2004 | Rupp et al. | | |
| 6,944,846 B2 * | 9/2005 | Ryzhov | ...................... | 717/116 |
| 6,957,425 B1 * | 10/2005 | Nadon et al. | ................ | 717/175 |
| 6,845,394 B2 | 12/2005 | Ritche | | |

(Continued)

OTHER PUBLICATIONS

Dehorah Hysell, "Single Sourcing for Translations", published by ACM 2001, pp. 89-94 (Year: 2001).*

(Continued)

*Primary Examiner* — Thuy Dao
*Assistant Examiner* — Zheng Wei
(74) *Attorney, Agent, or Firm* — Lowenstein Sandler LLP

(57) ABSTRACT

Embodiments relate to systems and methods for generating and storing translation information as package metadata. A physical or virtual client machine can host a set of installed software packages, including operating system, application, and/or other software. A package manager tracks the set of installed packages and language resources available for the installed set. The package manager can host or access a set of package attributes which include language specifications which indicates a language that should be used for search, display, and/or other activities. The language specifications be used to link to remote a remote repository storing various language metadata, including translations of source text. The resulting translated descriptions of source text from applications or other objects can be received and locally stored as translation information on the client machine. Translations can be periodically generated and/or updated.

20 Claims, 4 Drawing Sheets

(56) References Cited

U.S. PATENT DOCUMENTS

| | | | |
|---|---|---|---|
| 6,985,939 B2* | 1/2006 | Fletcher et al. | 709/223 |
| 6,993,759 B2* | 1/2006 | Aptus et al. | 717/170 |
| 7,055,131 B2* | 5/2006 | Charisius et al. | 717/109 |
| 7,120,681 B2 | 10/2006 | Lawing et al. | |
| 7,152,228 B2* | 12/2006 | Goodwin et al. | 717/146 |
| 7,174,533 B2* | 2/2007 | Boucher | 717/104 |
| 7,194,730 B2* | 3/2007 | Pramberger | 717/120 |
| 7,200,390 B1 | 4/2007 | Henager et al. | |
| 7,240,336 B1 | 7/2007 | Baker | |
| 7,284,151 B2 | 10/2007 | Chandrasekaran | |
| 7,349,960 B1 | 3/2008 | Pothier et al. | |
| 7,359,861 B2* | 4/2008 | Lee | 704/277 |
| 7,367,013 B2* | 4/2008 | Kang et al. | 717/106 |
| 7,512,939 B2 | 3/2009 | Brookner | |
| 7,552,452 B2* | 6/2009 | McHugh et al. | 719/331 |
| 7,580,960 B2* | 8/2009 | Travieso et al. | |
| 7,624,393 B2 | 11/2009 | Egan et al. | |
| 7,634,772 B2* | 12/2009 | Parthasarathy et al. | 717/178 |
| 7,657,885 B2 | 2/2010 | Anderson | |
| 7,669,198 B2* | 2/2010 | Chitale | 717/173 |
| 7,792,800 B1 | 9/2010 | Carson, Jr. et al. | |
| 7,797,151 B2* | 9/2010 | Apte et al. | 704/8 |
| 7,836,341 B1 | 11/2010 | Krishnan | |
| 7,853,943 B2 | 12/2010 | McCaleb et al. | |
| 7,979,530 B1* | 7/2011 | Lee | H04L 41/0859 709/223 |
| 7,987,087 B2* | 7/2011 | Rich | G06F 9/454 704/2 |
| 8,141,071 B2 | 3/2012 | McCaleb et al. | |
| 8,196,133 B2 | 6/2012 | Kakumani et al. | |
| 8,230,415 B1 | 7/2012 | Thomas | |
| 8,258,947 B2* | 9/2012 | Becker | G06F 9/454 340/540 |
| 8,312,440 B2 | 11/2012 | Iwama et al. | |
| 8,325,558 B2 | 12/2012 | Ryu | |
| 8,347,287 B2* | 1/2013 | Kakinari et al. | 717/178 |
| 8,554,758 B1 | 10/2013 | Larson et al. | |
| 8,700,998 B2* | 4/2014 | Togami, Jr. | G06F 9/454 715/264 |
| 8,856,953 B2 | 10/2014 | Antill | |
| 8,996,376 B2* | 3/2015 | Fleizach et al. | 704/260 |
| 9,009,184 B2* | 4/2015 | Bennett | G06F 17/2795 707/760 |
| 2002/0049788 A1* | 4/2002 | Lipkin et al. | 707/513 |
| 2002/0112200 A1* | 8/2002 | Hines | G06F 8/66 714/38.11 |
| 2002/0116702 A1* | 8/2002 | Aptus et al. | 717/170 |
| 2003/0028825 A1* | 2/2003 | Hines | G06F 11/2294 714/37 |
| 2003/0051235 A1 | 3/2003 | Simpson | |
| 2003/0066054 A1 | 4/2003 | Aarts et al. | |
| 2003/0088573 A1* | 5/2003 | Stickler | 707/100 |
| 2003/0187681 A1* | 10/2003 | Spain | G06F 17/2872 705/28 |
| 2003/0188293 A1* | 10/2003 | Boucher | 717/114 |
| 2003/0229890 A1 | 12/2003 | Lau et al. | |
| 2004/0103412 A1 | 5/2004 | Rao et al. | |
| 2005/0044541 A1* | 2/2005 | Parthasarathy et al. | 717/173 |
| 2005/0080721 A1* | 4/2005 | Kearney et al. | 705/38 |
| 2005/0097526 A1* | 5/2005 | Hauduc et al. | 717/136 |
| 2005/0204353 A1 | 9/2005 | Ji | |
| 2005/0210459 A1 | 9/2005 | Henderson et al. | |
| 2005/0256766 A1* | 11/2005 | Garcia | G06F 17/30241 705/14.54 |
| 2005/0268297 A1 | 12/2005 | Kovachka-Dimitrova et al. | |
| 2006/0075001 A1 | 4/2006 | Canning et al. | |
| 2006/0080651 A1 | 4/2006 | Gupta et al. | |
| 2006/0100973 A1* | 5/2006 | McMaster et al. | 707/1 |
| 2006/0123393 A1 | 6/2006 | Atkins et al. | |
| 2006/0156278 A1* | 7/2006 | Reager | G06F 9/454 717/104 |
| 2006/0190773 A1 | 8/2006 | Rao et al. | |
| 2006/0190820 A1* | 8/2006 | Chang et al. | 715/536 |
| 2006/0230398 A1 | 10/2006 | Yokota | |
| 2007/0038991 A1 | 2/2007 | Schuft et al. | |
| 2007/0083855 A1* | 4/2007 | Patel | G06F 9/4448 717/127 |
| 2007/0157192 A1 | 7/2007 | Hoefler et al. | |
| 2007/0169075 A1 | 7/2007 | Lill et al. | |
| 2007/0225965 A1* | 9/2007 | Fallen-Bailey et al. | 704/9 |
| 2007/0277167 A1 | 11/2007 | Smith et al. | |
| 2008/0019281 A1* | 1/2008 | Liger | G06F 9/454 370/252 |
| 2008/0052396 A1* | 2/2008 | Tell et al. | 709/226 |
| 2008/0134165 A1 | 6/2008 | Anderson et al. | |
| 2008/0141240 A1 | 6/2008 | Uthe | |
| 2008/0177994 A1* | 7/2008 | Mayer | G06F 9/4418 713/2 |
| 2008/0189096 A1* | 8/2008 | Apte et al. | 704/2 |
| 2008/0201703 A1* | 8/2008 | Lerum et al. | 717/172 |
| 2008/0201705 A1 | 8/2008 | Wookey | |
| 2009/0013319 A1 | 1/2009 | Williams et al. | |
| 2009/0037830 A1* | 2/2009 | Kulkarni et al. | 715/764 |
| 2009/0037897 A1 | 2/2009 | Dull et al. | |
| 2009/0076839 A1* | 3/2009 | Abraham-Fuchs | G06F 17/3064 705/2 |
| 2009/0216860 A1* | 8/2009 | Li | G06Q 10/067 709/219 |
| 2009/0241099 A1 | 9/2009 | Lee et al. | |
| 2009/0265690 A1 | 10/2009 | Naslaysky et al. | |
| 2009/0276206 A1* | 11/2009 | Fitzpatrick | G06F 9/454 704/2 |
| 2009/0300595 A1 | 12/2009 | Moran et al. | |
| 2010/0023933 A1 | 1/2010 | Bryant et al. | |
| 2010/0058308 A1 | 3/2010 | Demshur et al. | |
| 2010/0058314 A1 | 3/2010 | Wang | |
| 2010/0088695 A1* | 4/2010 | Kakinari et al. | 717/178 |
| 2010/0121906 A1 | 5/2010 | Ku et al. | |
| 2010/0131939 A1 | 5/2010 | Hieb et al. | |
| 2010/0185670 A1* | 7/2010 | Krishnan | G06F 17/2223 707/776 |
| 2010/0083243 A1 | 11/2010 | Mincarelli et al. | |
| 2010/0318743 A1* | 12/2010 | Fitzpatrick | G06F 9/454 711/126 |
| 2011/0040745 A1* | 2/2011 | Zaydman | G06F 17/30595 707/714 |
| 2011/0161829 A1* | 6/2011 | Kristensen | G01C 21/3611 715/739 |
| 2011/0191703 A1* | 8/2011 | Doser | G06F 9/454 715/763 |
| 2011/0214118 A1 | 9/2011 | Antill et al. | |
| 2012/0158621 A1* | 6/2012 | Bennett | G06F 17/30675 706/12 |
| 2012/0197896 A1* | 8/2012 | Li | G06F 17/30616 707/740 |

OTHER PUBLICATIONS

Pérez-Quiñones et al., "Automatic language translation for user interfaces", published by ACM 2005, pp. 60-63 (Year: 2005).*

Seth Kelby Vidal, "Systems and Methods for Initiating Software Repairs in Conjunction with Software Package Updates", U.S. Appl. No. 12/714,200, filed Feb. 26, 2010.

Seth Kelby Vidal, "Systems and Methods for Diagnostic Notification via Package Update Manager", U.S. Appl. No. 12/714,258, filed Feb. 26, 2010.

Seth Kelby Vidal, "Systems and Methods for Managing Software Package Updates Using Communication Pipes", U.S. Appl. No. 12/714,208, filed Feb. 26, 2010.

Seth Kelby Vidal, "Systems and Methods for Managing Versions of Software Packages", U.S. Appl. No. 13/037,363, filed Mar. 1, 2011.

Seth Kelby Vidal, "Systems and Methods for Generating Predictive Diagnostics via Package Update Manager", U.S. Appl. No. 12/714,222, filed Feb. 26, 2010.

James Antill, "Systems and Methods for Defining and Enforcing Access Policy for Package Update Processes", U.S. Appl. No. 12/873,850, filed Sep. 1, 2010.

Seth Kelby Vidal, "Systems and Methods for Generating Cached Representations of Encoded Package Profile", U.S. Appl. No. 12/788,139, filed May 26, 2010.

(56) References Cited

OTHER PUBLICATIONS

Seth Kelby Vidal, "Systems and Methods for Generating Cached Representations of Host Package Inventories in Remote Package Repositories", U.S. Appl. No. 12/790,699, filed May 28, 2010.
Seth Kelby Vidal, "Systems and Methods for Generating Package Profiles in Software Package Repositories Using Selective Subsets of Packages", U.S. Appl. No. 12/873,557, filed Sep. 1, 2010.
Seth Kelby Vidal, "Systems and Methods for Generating an Encoded Package Profile Based on Executing Host Processes", U.S. Appl. No. 12/787,104, filed May 26, 2010.
Seth Kelby Vidal, "Systems and Methods for Restoring Machine State History Related to Detected Faults in Package Update Process", U.S. Appl. No. 12/788,036, filed May 26, 2010.
Seth Kelby Vidal, "Systems and Methods for Generating Client Qualilfication to Execute Package Update Manager", U.S. Appl. No. 12/788,458, filed May 27, 2010.
Seth Kelby Vidal, "Systems and Methods for Determining When to Update a Package Manager Software", U.S. Appl. No. 12/790,752, filed May 28, 2010.
Seth Kelby Vidal, "Systems and Methods for Generating Exportable Encoded Identifications of Networked Machines Based on Installed Package Profiles", U.S. Appl. No. 12/768,416, filed Apr. 27, 2010.
Seth Kelby Vidal, "Systems and Methods for Tracking Computing Systems Utilizing Software Repositories", U.S. Appl. No, 12/955,671, flied Nov. 29, 2010.
Seth Kelby Vidal, "Systems and Methods for Automatic Upgrade and Downgrade in Package Update Operations", U.S. Appl. No. 12/892,227, filed Sep. 28, 2010.
Seth Kelby Vidal, "Systems and Methods for Detection of Malicious Software Packages", U.S. Appl. No. 12/898,876, filed Oct. 6, 2010.
Seth Kelby Vidal, "Systems and Methods for Space Efficient Software Package Management", U.S. Appl. No. 12/610,006, filed Oct. 30, 2009.
NixCrail, "How to Simulate Linux Package Upgrade Without Installing Anything (Dry Run)" Jul. 6, 2008, 7 pages.
Ramankutty, Hiran, "Inter-Process Communication—Part 1," Oct. 29, 2014, Linux Gazelle, 12 pages.
USPTO, Office Action for U.S. Appl. No. 12/714,200, dated May 13, 2011.
USPTO, Final Office Action for U.S. Appl. No. 12/714,200, dated Nov. 10, 2011.
USPTO, Notice of Allowance for U.S. Appl. No. 12/714,200, dated Feb. 29, 2012.
USPTO, Office Action for U.S. Appl. No. 12/714,258, dated Jun. 23, 2011.
USPTO, Final Office Action for U.S. Appl. No. 12/714,258, dated Dec. 6, 2011.
USPTO, Office Action for U.S. Appl. No. 12/714,258, dated Dec. 19, 2012.
USPTO, Final Office Action for U.S. Appl. No. 12/714,258, dated Jul. 15, 2013.
USPTO, Office Action for U.S. Appl. No. 12/714,258, dated Mar. 26, 2014.
USPTO, Final Office Action for U.S. Appl. No. 12/714,258, dated Oct. 28, 2014.
USPTO, Advisory Action for U.S. Appl. No. 12/714,258, dated Feb. 21, 2012.
USPTO, Advisory Action for U.S. Appl. No. 12/714,258, dated Sep. 18, 2013.
USPTO, Advisory Action for U.S. Appl. No. 12/714,258, dated Jan. 6, 2015.
USPTO, Notice of Allowance for U.S. Appl. No. 12/714,258, dated Apr. 22, 2015.
USPTO, Office Action for U.S. Appl. No. 12/714,222, dated Dec. 6, 2012.
USPTO, Office Action for U.S. Appl. No. 12/714,222, dated May 24, 2013.
USPTO, Final Office Action for U.S. Appl. No. 12/714,222, dated Oct. 23, 2013.
USPTO, Office Action for U.S. Appl. No. 12/714,222, dated Apr. 8, 2014.
USPTO, Final Office Action for U.S. Appl. No. 12/714,222, dated Aug. 12, 2014.
USPTO, Office Action for U.S. Appl. No. 12/714,222, dated Nov. 19, 2014.
USPTO, Advisory Action for U.S. Appl. No. 12/714,222, dated Jan. 10, 2014.
USPTO, Advisory Action for U.S. Appl. No. 12/714,222, dated Oct. 20, 2014.
USPTO, Notice of Allowance for U.S. Appl. No. 12/714,222, dated Jun. 3, 2015.
USPTO, Notice of Allowance for U.S. Appl. No. 12/714,222, dated Jul. 10, 2015.
USPTO, Office Action for U.S. Appl. No. 12/714,208, dated Nov. 20, 2012.
USPTO, Final Office Action for U.S. Appl. No. 12/714,208, dated Mar. 25, 2013.
USPTO, Office Action for U.S. Appl. No. 12/714,208, dated Jun. 12, 2013.
USPTO, Final Office Action for U.S. Appl. No. 12/714,208, dated Nov. 27, 2013.
USPTO, Office Action for U.S. Appl. No. 12/714,208, dated Mar. 25, 2014.
USPTO, Final Office Action for U.S. Appl. No. 12/714,208, dated Jul. 10, 2014.
USPTO, Office Action for U.S. Appl. No. 12/714,208, dated Nov. 4, 2014.
USPTO, Final Office Action for U.S. Appl. No. 12/714,208, dated Feb. 18, 2015.
USPTO, Advisory Action for U.S. Appl. No. 12/714,208, dated Mar. 4, 2014.
USPTO, Advisory Action for U.S. Appl. No. 12/714,208, dated Sep. 24, 2014.
USPTO, Notice of Allowance for U.S. Appl. No. 12/714,208, dated Mar. 19, 2015.

* cited by examiner

GENERATING AND STORING TRANSLATION INFORMATION AS PACKAGE METADATA

FIELD

The present teachings relate to systems and methods for generating and storing translation information as package metadata, and more particularly to platforms and techniques for generating and linking language translation information to software package updates by encoding that information as metadata related to those objects, and hosting that metadata in package repositories and/or other sites.

BACKGROUND OF RELATED ART

Users of physical or virtual machines commonly install software packages, including package updates, to physical or virtual machines. The software packages can contain a set of related files chosen to perform a given application or task, such as, for example, a group of software applications, drivers, and/or other resources used to install and use messaging applications. In instances, a software package can contain application software, operating system software, drivers, patches, and/or other software components grouped as a logical set.

Software package update managers exist to help a user initiate and perform software package updates, such as, for example, the "yum" (Yellowdog update manager) package update manager available from Red Hat Inc., and others. In general, available software package managers are configured to interact with the set of installed packages on a client and with one or more software package repositories, to directly connect to those databases and download available package updates.

In the case of software packages which are intended for multiple markets or geographic regions, users may wish to receive images of the packages in various local languages. Users may frequently wish to view translated versions at various times, including when the user wishes to use a search term in a different language to search the package or related files. Users may also wish to view the operational functions of packages which they have installed, but not yet operated, in different languages, and at other times. Conventional package management platforms do not contain a convenient facility the translation of software packages into and out of different languages. It may be desirable to provide systems and methods for for generating and storing translation information as package metadata, in which translated text and other data for different language versions of a package can be abstracted and hosted in a remote repository, and accessed when needed in the language in which the package manager itself and/or other software is operated.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for generating and storing translation information as package metadata. More particularly, embodiments related to platforms and techniques for managing the language resources associated with sets of installed packages on a client machine. In aspects, a package manager can track and manage the installation of one or more software packages and/or updates to those packages (which may be referred to together as a "software package update") on a client, host, target, and/or other machine. The package manager can host and/or manage the distribution, installation, and operation of a set of installed packages on a client or other target machine. In aspects, the package manager can host and manage a set of language specifications for various installed packages the client. The language specifications can link to a local or remote repository which can store a set of language metadata associated with subject packages, including, for instance, sets of translations of descriptions, interface elements, and/or other text embedded in or used by the various packages. When a user wishes to access a package using a local language or at other times, the package manager can access the repository and retrieve language metadata related to the user's package of interest. Language-specific versions of applications, files, text, and/or other data can be imported to the client, and in embodiments, can be locally stored in the client for later access and use. These and other embodiments described herein address the various noted shortcomings in known package translation technology, and provide a user with enhanced language facilities, including an ability to conveniently obtain and update selected language versions of installed or prospective packages.

Reference will now be made in detail to exemplary embodiments of the present teachings, which are illustrated in the accompanying drawings. Where possible the same reference numbers will be used throughout the drawings to refer to the same or like parts.

Figure 1:
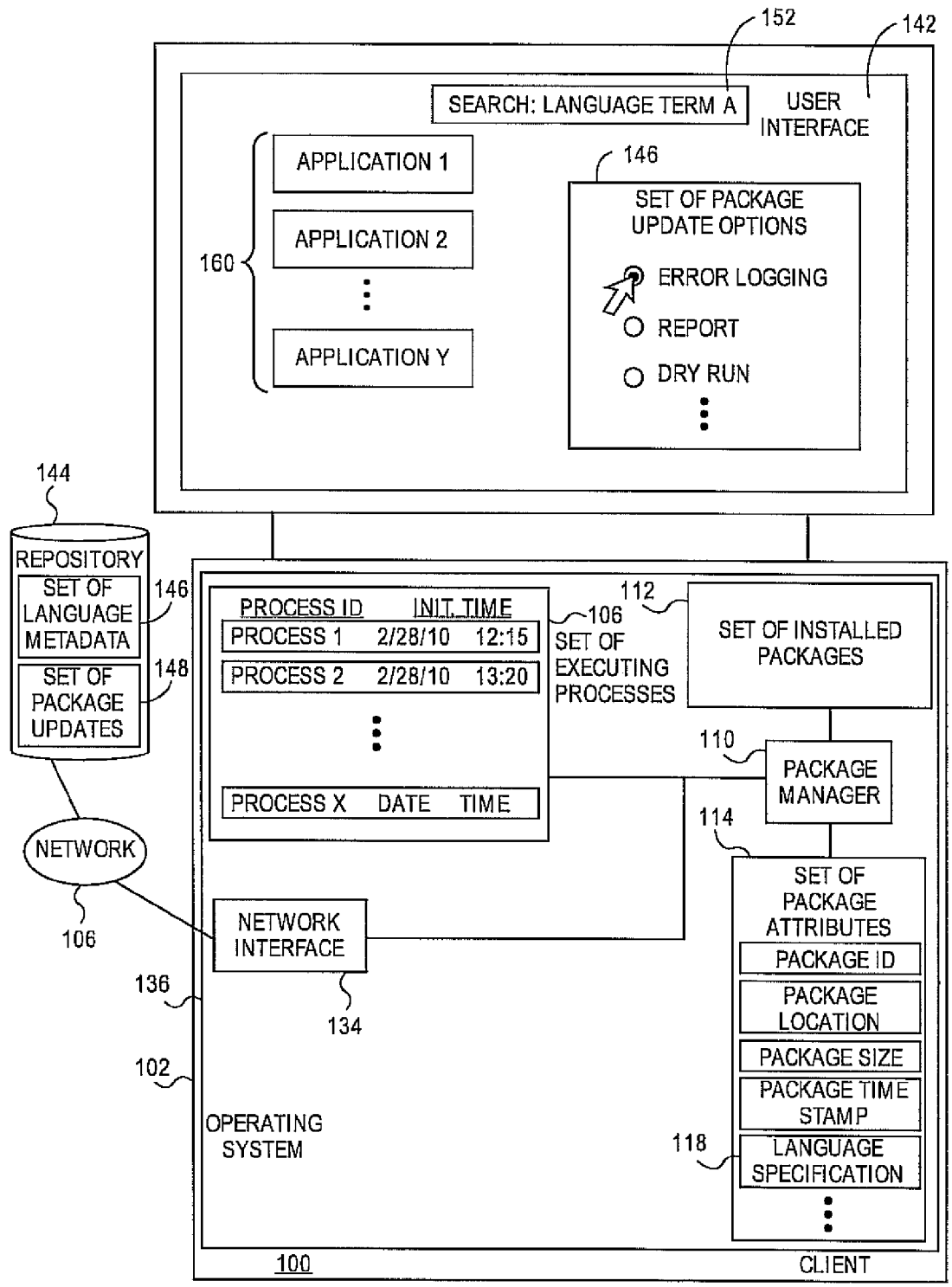
FIG. 1 illustrates an overall network in which systems and methods for generating and storing translation information as package metadata can be implemented, according to various embodiments.

FIG. 1 illustrates an exemplary system 100 in which systems and methods for generating and storing translation information as package metadata can be implemented, according to various embodiments. In embodiments as shown, a client 102 can store, execute, and otherwise host a variety of resources including a package manager 110 configured to communicate with a set of installed packages 112, and other hardware, software, and other resources. In embodiments, package manager 110 can be or include a software application, a utility, an application programming interface (API) to an operating system 136 of client 102, a service, and/or other local or remote logic or resources. According to embodiments, in package manager 110 can access and manage set of installed packages 112 to run, edit, update, configure, and otherwise manage one or more software packages hosted or installed in client 102. In aspects, package manager 110 can be or include one or more commercially and/or publicly available package manager applications or resources, such as the "yum" package update manager available from Red Hat Inc. based on or compatible with the Red Hat package manager (rpm) platform, or others.

In aspects, set of installed software packages 112 can be or include packages comprising various types of applications, such as, for example, messaging applications, spreadsheet or modeling applications, social networking applications, word processing applications, and/or other applications or utilities, and can in aspects include an operating system, drivers, and/or components thereof. Set of installed packages 112 can have an associated set of package attributes 114 which records file names, versions, dates, software requirements, an/or other attributes related to the software package updates installed on client 102 and reflected in set of installed software packages 112.

In aspects, package manager 110 can communicate with a network interface 134 configured to connect to one or more network 106, such as the public Internet or other public or private networks. Package manager 110 can thereby connect to one or more package repository 144 hosting software packages including software package including updates, and/or other software or resources.

In aspects, package manager 110 can interact with set of installed packages 112 and one or more package repository 144 via set of communication pipes 104 to configure, test, update, and/or otherwise manage set of installed packages 112 operating on client 102, including language resources for those packages. Package manager 110 can, for example, provide a user with a set of package update options 146 displayed via user interface 142, such as a graphical user interface or others, to select various test, configuration, and/or other management activities on set of installed packages 112. Set of package update options 146 can include options such as one or more selections to perform to select packages for installation and/or update, installation options, and/or other options or parameters for the downloading of package updates from one or more package repositories to set of installed packages 112.

In aspects, package manager 110 can access data related to the language used in the descriptions, user interfaces, and/or other aspects of set of installed packages to manage the selection of languages used and displayed in set of installed packages 112 and/or constituent files. In aspects, set of package attributes 114 which describe set of installed packages 112 can include a language specification 118. Language specification 118 can be or include one or more identifiers for languages to be used and/or translation in set of installed packages 112 and/or constituent files. For example, language specification 118 can contain a reference to "English," "Spanish," "Japanese," "French" and/or other languages, and/or codes for those various languages. In embodiments, language specification 118 can in addition or instead contain a reference to a geographic region which is linked to a language or set of languages that are used in that location. Other data can be encoded in language specification 118. According to aspects, in general package manager 110 and/or other logic can used language specification 118 for one or more selected packages to access a set of language metadata 146 stored in a local or remote package repository 144. The set of language metadata 146 can contain textual translations and other information for purposes of language management and translation of the textual content of set of installed packages 112, on an abstracted basis. In general package manager 110 can access and/or use set of language metadata 146 to generate language translations, language updates, and/or other actions on set of installed packages 112 and associated files.

Figure 2:
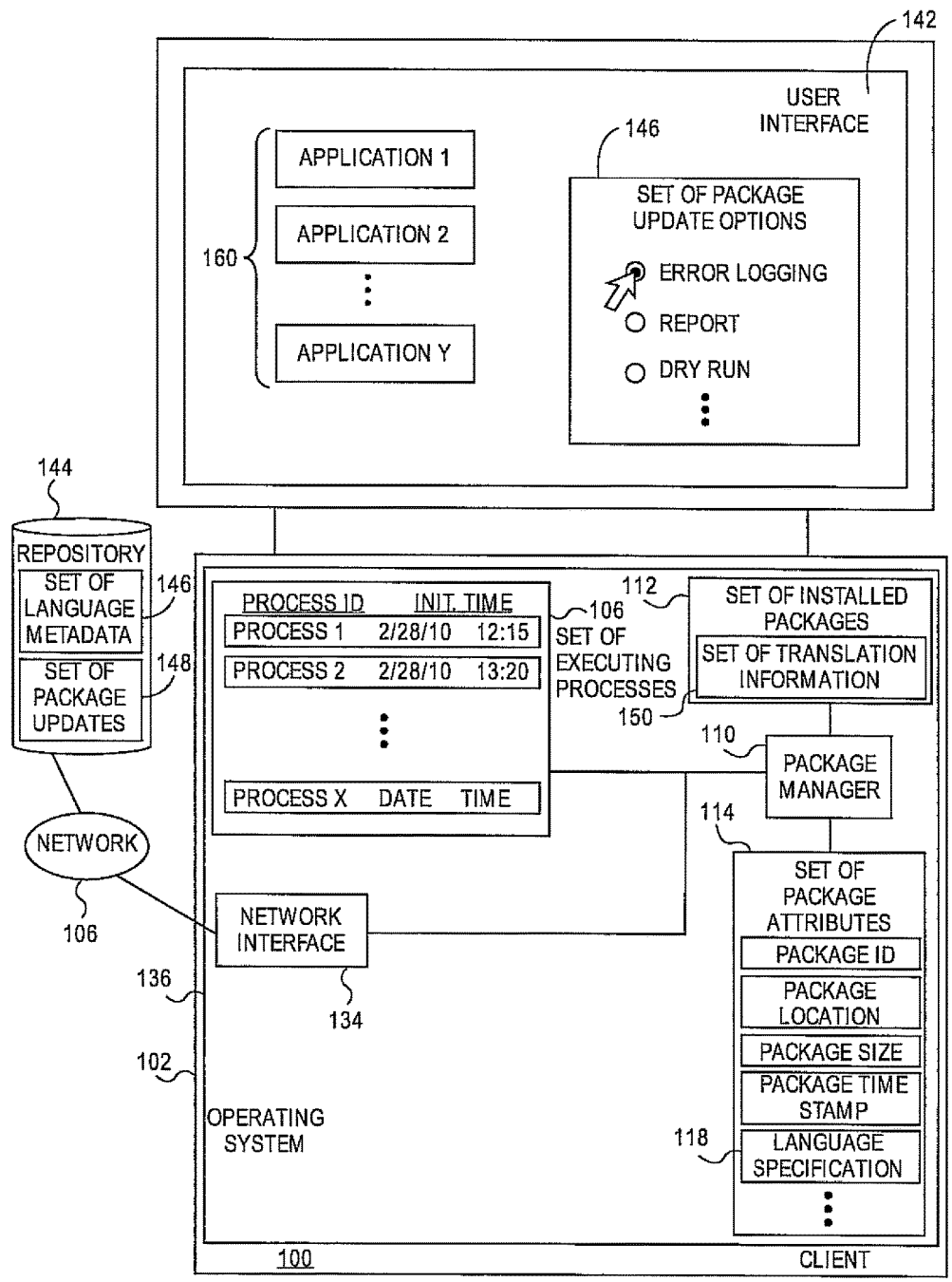
FIG. 2 illustrates an overall network in which for systems and methods for for generating and storing translation information as package metadata can be implemented, according to various embodiments in further regards.

As illustrated for example more particularly in FIG. 2, package manager 110 can connect to set of language metadata 146 hosted in one or more package repository 144 via one or more network 106. Package manager 110 can access and/or invoke one or more repository 144 to manage set of installed packages 112 at any time, before, during, and/or after booting client 102, the instantiation of a package in set of installed packages 112, the updating of a package, and/or at other times. At any of those times or others, package manager 110 can read out the language specification 118 in set of package attributes 114, and access one or more repository to access the set of language metadata 146 identified by language specification 118 and/or the subject package(s). In aspects, package manager 110 can retrieve set of language metadata 146 related to or specified by those parameters. The set of language metadata 146 can contain a set of translation information 150, such as a translation of one or more portions of the subject package(s). In aspects, one or more repository 144 can transmit set of language metadata 146, including set of translation information 150, to package manager 110 in response to that communication.

In aspects, package manager 110 can use set of language metadata 146 including set of translation information 150 to receive and process, for instance, a set of search terms 152 which can contain or reference textual content in different and/or translated languages. In aspects, package manager 110 can perform additional actions with translation information, such as, for example, to change the language in which a user interface of set of installed packages 112 is expressed. In embodiments, set of translation information 110 can contain translations into two or more languages, according to user selection or other factors. It may be noted that package manager 110 can request or access set of language metadata 146 at different times during the operation of client 102 and execution or use of set of installed packages. It may also be noted that the set of language metadata 146 including translation information 150 can be received and/or updated at various times in one or more repository 144. For instance, one or more repository 144 can receive dictionaries, tables, and/or other data encoding translations from one language into another from various services, including for instance human-generated language services and/or automatic translation services or databases. Other sources of translation information 150 can be used. In embodiments, set of language metadata 146 including translation information 150, once accessed and retrieved, can be locally stored on client 102, such as in data store 138 and/or other locations for future use. In aspects, translation information 150 can be generated and stored before translation of particular terms is called for by package manager 110, and/or can be generated on the fly, on a demand basis.

Figure 3:
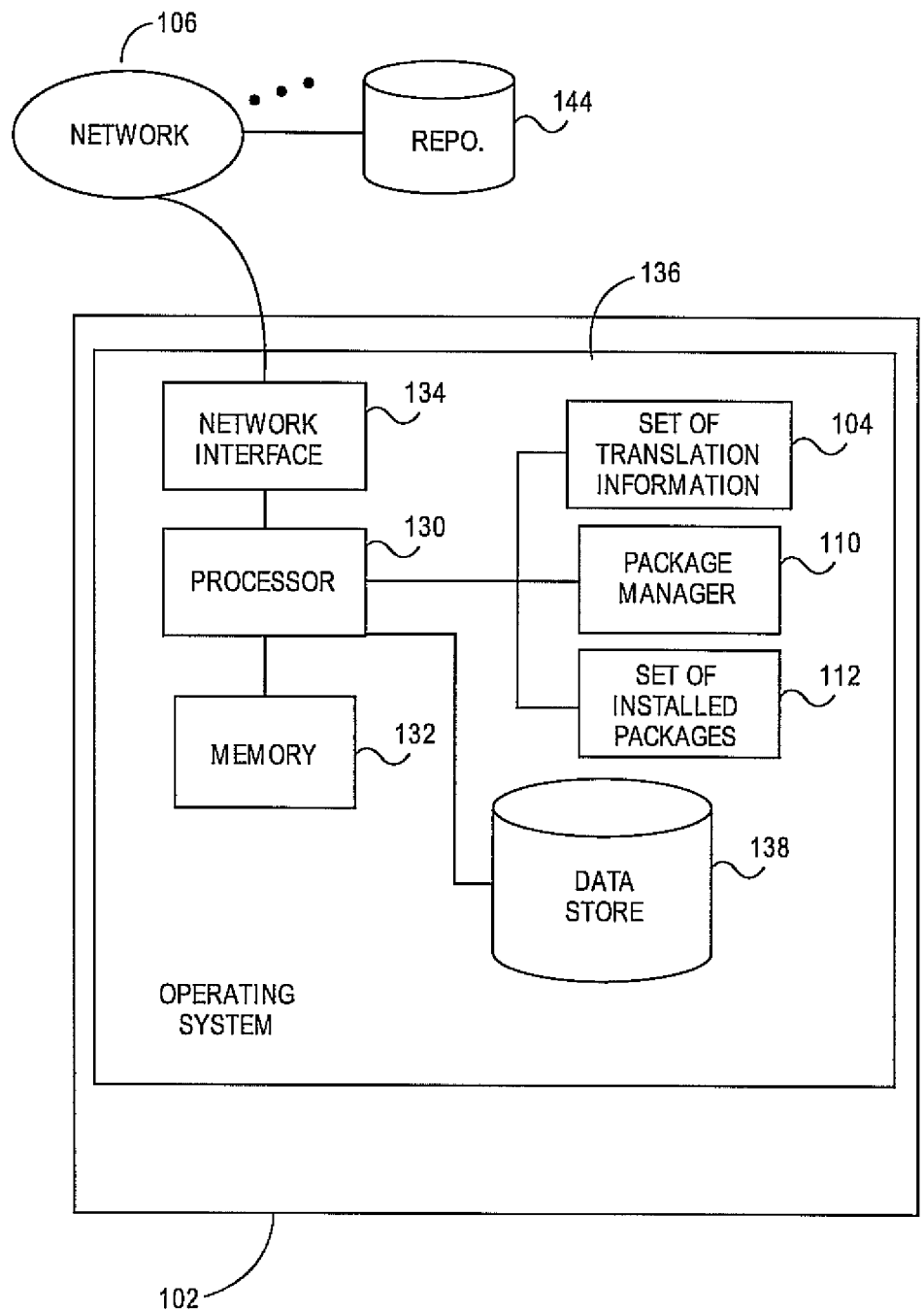
FIG. 3 illustrates exemplary hardware and other resources of a client machine that can be used in systems and methods for for generating and storing translation information as package metadata, according to various embodiments.

FIG. 3 illustrates an exemplary diagram of hardware and other resources that can be incorporated in a client 102 configured to manage, analyze, test and configure language and other resources for set of installed packages 112 and other resources, according to embodiments. In embodiments as shown, client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with data store 138, such as a database stored on a local hard drive. Processor 130 further can communicate with a network interface 134, such as an Ethernet or wireless data connection, which in turn communicates with one or more networks 106, such as the Internet or other public or private networks. Processor 130 also communicates with package manager 110 and/or other resources to execute control logic and control the updating, installation, analysis and management of software packages and their associated processes. Other configurations of client 102, including processor and memory resources, associated network connections, and other hardware and software resources are possible.

Figure 4:
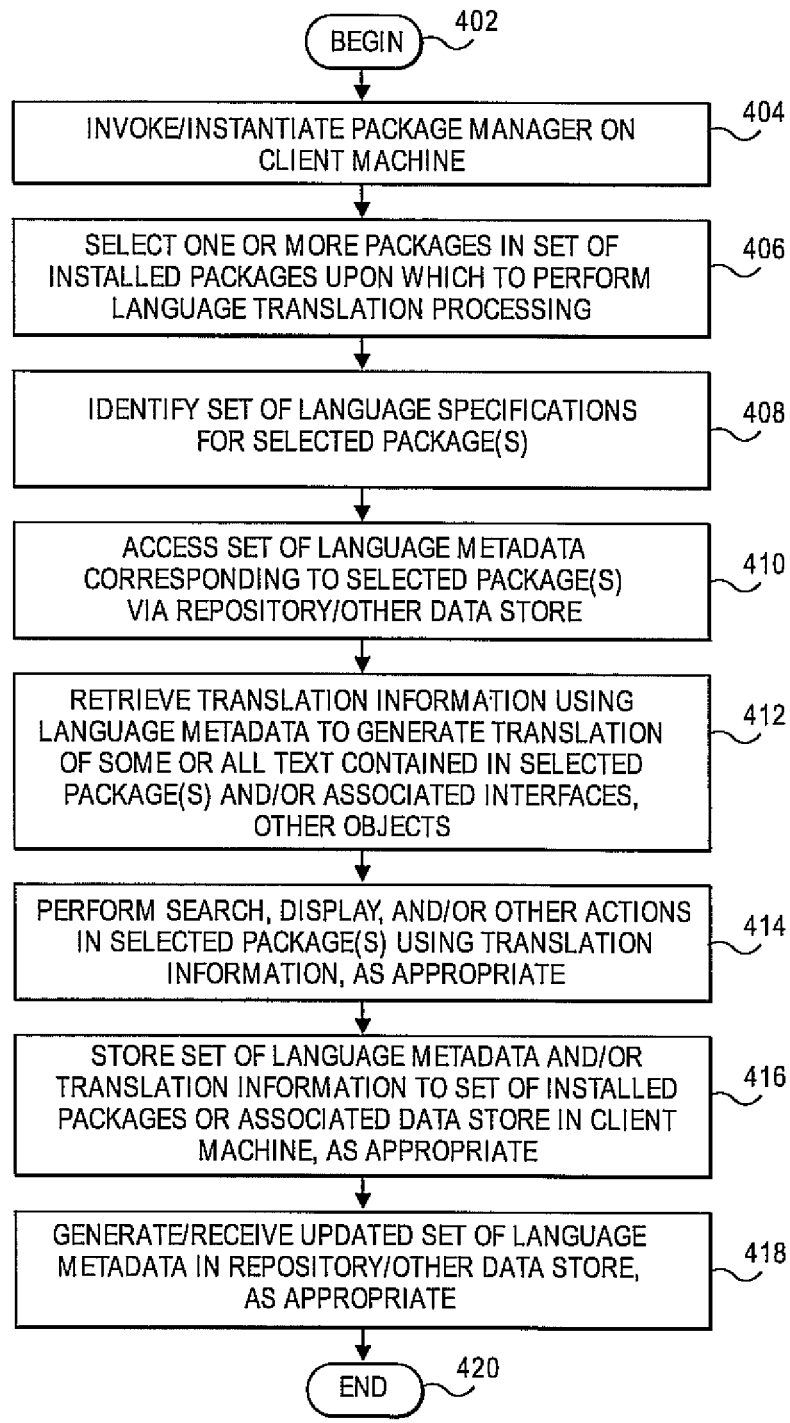
FIG. 4 illustrates a flowchart of software package update management and language processing that can be used in systems and methods for generating and storing translation information as package metadata, according to various embodiments.

FIG. 4 illustrates overall processing to track, monitor, and manage software package updates and associated language translations and other resources, according to various embodiments. In 402, processing can begin. In 404, a user can invoke or instantiate package manager 110 on client 102 to perform software package update maintenance, testing, and other management activity. In 406, a user can select one or more packages in set of installed packages 112 upon which to perform language translation processing, such as, for example, to translate a description or user interface element from one language to another, such as English to Spanish, and/or other language translations.

In 408, a language specification 118 can be identified for the selected package(s). For example, package manager 110 can look up a specifier for a language, and/or a specifier for a geographic region for which one or more language is linked or specified, in set of package attributes 114. In 410, set of language metadata 146 corresponding to the selected package(s) can be accessed via one or more repository 144 and/or other data store or resource. In 412, set of translation information 150 can be retrieved from/using set of language metadata 146 to generate a language translation of some or all of the text contained in the selected package(s), contained in user-supplied search terms to package manager 110, contained in interface elements for package manager 110, set of installed packages 112 and/or interface elements or descriptions for files or applications contained in set of installed packages 112, and/or other objects.

In 414, package manager 110 and/or other logic can perform search, display, and/or other actions or processing in or on any one or more package and/or associated filed in set of installed packages 112 using translation information 150, as appropriate. In 416, package manager 110 and/or other logic can store set of language metadata 146, translation information 150, and/or portions of either to associated data store 138 of client 102 or other local or remote storage, as appropriate. In cases where set of language metadata 146 and/or translation information 150 is stored to client 102, that information can for example be stored to, or in association with, set of installed packages 112, set of package attributes 114, and/or other data. In 418, an updated set of language metadata 146, and/or updated set of translation information 150, can be generated and/or received in one or more repository 144 and/or other data store. In aspects, updated language metadata and/or translation information 150 can be accessed or received from a local or remote language translation service or facility. The language translation service or facility generate used to generate metadata, translations, and/or various updates can comprise an automated translation facility or service, and/or a human-generated translation facility or service. In 420, processing can return to a prior processing point, jump to a further processing point, or end.

The foregoing description is illustrative, and variations in configuration and implementation may occur to persons skilled in the art. For example, while embodiments have been described in which a unitary package manager 110 is configured to control package update activity, in embodiments, multiple applications or software can interact to control the downloading, installation, testing, and other management of software packages. For further example, while embodiments have been described in which package update activity is conducted on one client 102, in embodiments, multiple local or remote targets, clients, and/or other machines can register to package manager 110 and/or other logic or resources to receive or perform package update activity. Other resources described as singular or integrated can in embodiments be plural or distributed, and resources described as multiple or distributed can in embodiments be combined. The scope of the present teachings is accordingly intended to be limited only by the following claims.

What is claimed is:

1. A method, comprising:
   receiving, by a processor, a user input specifying a search term in a first natural language;
   identifying, using the search term, a software package installed on a client, wherein a user interface of the software package utilizes a second natural language;
   identifying, by the processor, a set of language specifications associated with the software package, wherein the set of language specifications identifies the first natural language and the second natural language;
   accessing, by the processor, a remote repository to extract a set of language metadata associated with the set of language specifications, wherein the set of language metadata comprises on-demand generated translation information, wherein the on-demand generated translation information includes translations of one or more user interface elements from the second natural language into the first natural language;
   responsive to initiating the software package on the client, translating a text associated with the software package from the second natural language into the first language by the processor using the set of language metadata to produce a translated text in the first natural language; and
   changing, by the processor using the translated text, the user interface language of the software package to the first natural language.

2. The method of claim 1, wherein the text associated with the software package comprises a text displayable by the software package.

3. The method of claim 1, wherein the set of language specifications comprises a language identity specification or a geographical region specification.

4. The method of claim 1, further comprising storing the set of language metadata in association with the software package.

5. The method of claim 1, wherein at least part of the associated set of language metadata is received via a translation service.

6. The method of claim 1, wherein the text associated with the software package comprises a text contained in a user interface element of the software package.

7. The method of claim 1, wherein accessing the remote repository is performed before booting the client.

8. The method of claim 1, further comprising:
   storing the set of language metadata in association with package attributes of the software package, wherein the package attributes specify one or more file names associated with the software package.

9. The method of claim 1, further comprising:
visually representing, via a graphical user interface, a set of package update options in the first natural language.

10. The method of claim 1, further comprising:
visually representing, via a graphical user interface, a set of package update options for one or more software packages matching the translated search term in the first natural language.

11. A system, comprising:
a memory;
a processor, operatively coupled to the memory, the processor to:
receive a user input specifying a search term in a first natural language;
identify, using the search term, a software package installed on a client, wherein a user interface of the software package utilizes a second natural language;
identify a set of language specifications associated with the software package, wherein the set of language specifications identifies the first natural language and the second natural language;
accessing a remote repository to extract a set of language metadata associated with the set of language specifications;
responsive to initiating the software package on the client, translate a text associated with the software package from the first natural language into the second natural language using the set of language metadata to produce a translated text, wherein the set of language metadata comprises on-demand generated translation information, wherein the on-demand generated translation information includes translations of one or more user interface elements from the second natural language into the first natural language; and
change, using the translated text, the user interface language of the software package to the first natural language.

12. The system of claim 11, wherein the text associated with the software package comprises a text displayable by the software package.

13. The system of claim 11, wherein the set of language specifications comprises a language identity specification or a geographical region specification.

14. The system of claim 11, wherein the processor is to store the set of language metadata in association with the software package.

15. The system of claim 11, wherein at least part of the set of language metadata is received via a translation service.

16. The system of claim 11, wherein the text associated with the software package comprises a text contained in a user interface element of the software package.

17. The system of claim 11, wherein the processor is to access the remote repository before booting the client.

18. The system of claim 11, wherein the processor is further to:
store the set of language metadata in association with package attributes of the software package, wherein the package attributes specify one or more file names associated with the software package.

19. The system of claim 11, wherein the processor is further to:
visually represent, via a graphical user interface, a set of package update options in the first natural language.

20. The system of claim 11, wherein the processor is further to:
visually represent, via a graphical user interface, a set of package update options in the first natural language.

* * * * *